United States Patent Office 3,473,349
Patented Oct. 21, 1969

3,473,349
ELASTIC SHAFT COUPLING
Takanobu Tateyama, 213 Yoshidajutaku 40, Yoshida Shimanouchi, Kawachi-shi, Osaka, Japan
Filed July 25, 1967, Ser. No. 655,837
Claims priority, application Japan, July 27, 1966, 41/48,732
Int. Cl. F16d 3/14
U.S. Cl. 64—27                                    3 Claims

ABSTRACT OF THE DISCLOSURE

An improved elastic shaft coupling assembly comprises a pair of coupling flanges positioned in face to face relation and connected respectively to driving and driven sides of a line shafting, and an elastic band of high shock absorbing property intervening between the tow coupling flanges for connecting them by holding the projections of the respective flanges within its spirally wound structure.

---

The present invention relates to an improved elastic shaft coupling, more particularly relates to an improved elastic shaft coupling comprising a coupling flange of the driving side, a coupling flange of the driven side and an intervening elastic connecting band such as an elastic band made of steel which connects those two coupling flanges to form the coupling assembly.

In the conventional type of elastic shaft coupling, elastic materials such as rubber, leather or thin metallic plates are used as the intervening member for connecting the two coupling flanges to form the coupling assembly. However, such a conventional type of elastic shaft coupling has many disadvantages such as insufficient prevention of transmission of mechanical vibration from the driving side to the driven side, a large energy loss caused by friction between the members composing the shaft coupling and poor absorptivity of impulsive variation of the turning effort.

The principal object of the present invention is to provide an improved elastic shaft coupling which can transmit power with less frictional energy loss.

The other object of the present invention is to provide an improved elastic shaft coupling having good absorptivity of impulsive variation of the turning effort of line shafting.

Further object of the present invention is to provide an improved elastic shaft coupling which can withstand long use and impact loading, and which can be produced at low cost and by a simple method.

Further features and advantages of the present invention will be apparent from the ensuing description with reference to the accompanying drawings.

Figure 1:
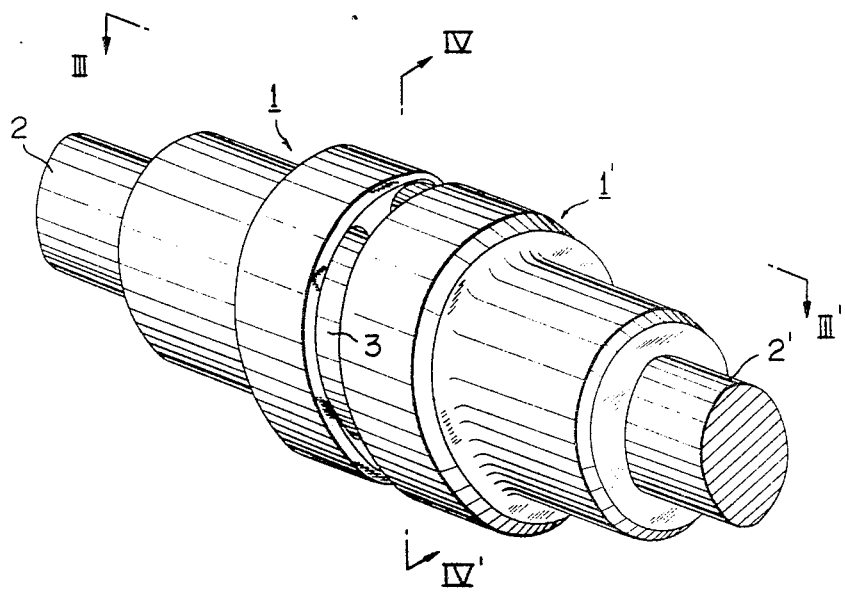
Figure 2:
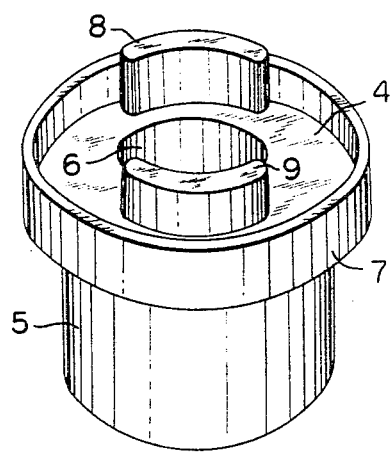
Figure 3:
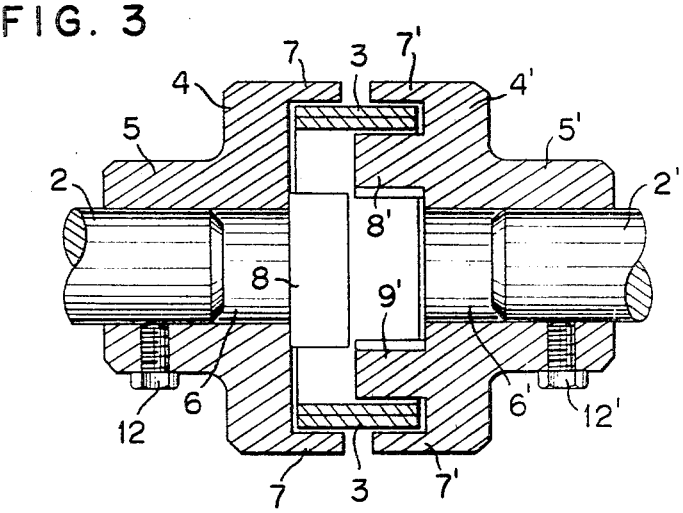
Figure 5:
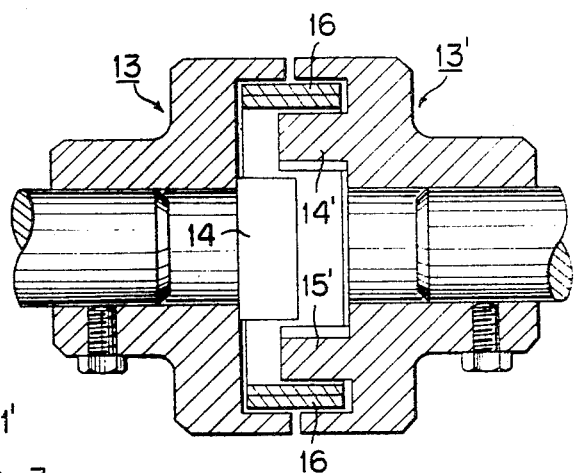
Figure 4:
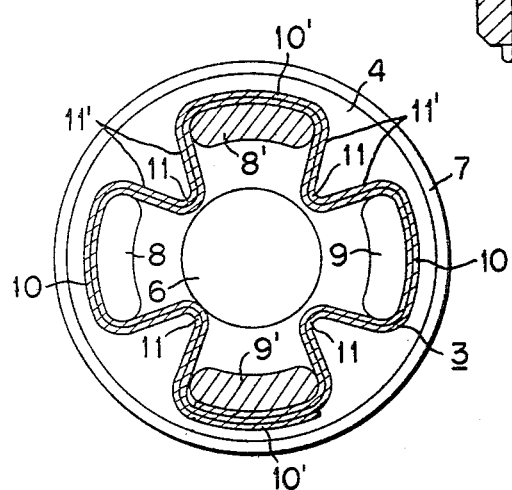

FIG. 1 is a perspective view of an elastic shaft coupling of the present invention in an assembled condition, FIG. 2 is a perspective view of an embodiment of the coupling flange of the present invention used for the elastic shaft coupling, FIG. 3 is a section taken along the line III–III' in FIG. 1, FIG. 4 is a section taken along the line IV–IV' in FIG. 1, FIG. 5 is a sectional side view of another embodiment of the elastic shaft coupling of the present invention in an assembled condition.

Referring to FIG. 1, the elastic shaft coupling of the present invention comprises a coupling flange 1 which is connected to the driving shaft 2, a coupling flange 1' which is connected to the driven shaft 2', both by a suitable manner and a band spring 3 disposed between the two coupling flanges 1, 1' for connecting the two coupling flanges in a face to face relation to form the coupling assembly. In this line shafting, the rotation of the driving shaft 2 is transmitted to the driven shaft 2' by means of the elastic shaft coupling of the present invention which connects the two shafts 2, 2' in a coaxial condition under normal rotation.

The structure of an embodiment of the coupling flanges of the present invention is shown in FIG. 2, wherein the coupling flange 1 is composed of a flanged portion 4, and a boss portion 5. One end of the boss portion 5 is connected to the driving shaft 2 of the line shafting by a suitable manner such as, for example, fitting the end of the shaft 2 into the hole 6 drilled along the axis shaftline of the coupling flange 1 and setting it with a set screw 12. The other end of the boss portion 5 extends as a flanged portion 4 provided with a circular wall 7 disposed at the brim portion of the flanged portion 4. The flanged portion 4 is also provided with a pair of projections 8 and 9 extending perpendicularly to the surface of the flanged portion 4. These projections 8, 9 are positioned symmetrically with respect to the center of the flanged portion 4 having a clearance between the outer surfaces of the projections 8, 9 and the inner surface of the circular wall 7 sufficient for disposing the band spring 3 of the present invention into the clearance as described in the ensuing description.

In FIGS. 3 and 4, the assembled condition of the elastic shaft coupling embodying the present invention is shown. The band spring 3 of the present invention is made of materials ordinarily used for springs and wound spirally in such a manner that the band spring 3 has four outwardly extending convex portions 10, 10, 10', 10' and four inwardly extending concave portions 11 with each two adjacent convex portions 10, 10' connected to its common concave portion 11 by means of two intermediate or leg portions 11' so that each convex portion 10, 10, 10', 10' is formed in a symmetrical relation with respect to the center of the circle formed by the outer surface of the convex portions, as seen in FIG. 4. Assembly of the coupling flanges 1, 1' is performed by disposing the band spring 3 to one coupling flange 1 in such a manner that the two convex portions 10, 10 of the band spring 3 are inserted into the clearance between the projections 8, 9 and the circular wall 7 of the flanged portion 4 holding the projections 8, 9 from the outside, and disposing another coupling flange 1' to the coupling flange 1 and the band spring 3 already assembled in such a manner that the projections 8', 9' are inserted into the inside of other convex portions 10', 10' of the band spring 3.

As this is assembled in the manner described above, the projections 8, 8', 9, 9' are respectively held firmly by the convex and intervening concave portions of the band spring 3 permitting a small circular displacement of one coupling flange against the other. The application of the band spring of the present invention results in an effective power transmission of the line shaft with less energy loss and elimination of excessive frictional contact between the assembly components. This is one of the great advantages of the present invention. Another advantage of the present invention is the shock absorbing effect of the shaft coupling provided by the elasticity of the band spring. When an impulsive variation of the turning effort takes place on the driving shaft, the coupling flange on the driving side has a tendency to be displaced circularly against the coupling flange on the driven side, and this relative circular displacement of one flange in relation to the other causes a dimensional strain of the intervening band spring by means of the projections holding the band spring as described above. This strain energy bestowed to the band spring is stored as elastic strain energy and finally this is consumed during the rolling movement of the band spring corresponding to the variation of the turning effort. Consequently, the impulsive variation of the turning effort on the driving side is completely absorbed by the shaft coupling of the present invention and is not transmitted to the driven side. It is also possible to increase the number of projections of the coupling flanges and accordingly to change the shape of the band spring, as required by the amount of power to be transmitted.

In FIG. 5, another embodiment of the elastic shaft coupling of the present invention is shown, wherein both of the coupling flanges 13, 13' are connected by the intervening band spring 16 in the same manner as described above. In this embodiment both of the coupling flanges 13, 13' are connected in closer condition to each other than in case of the embodiment shown in FIG. 3, consequently, the top surfaces of the projections 14, 15 of one coupling flange 13 extend beyond the plane defined by the top surfaces of the projections 14', 15' of the other coupling flange 13'.

While the invention has been described in conjunction with certain embodiment thereof it is to be understood that various modifications and changes may be made without departing from the spirit and scope of the invention.

What is claimed is:

1. An improved elastic shaft coupling for operatively connecting a driving and a driven shaft comprising a pair of spaced flanges each having a surface substantially parallel with and facing the other surface, a pair of projections connected to each of said surfaces and extending perpendicularly to their respective connected surfaces, said projections being oppositely disposed on either side of the axis of the respective coupling flange, each projection of each flange facing a projectionless area of the surface of the oppositely facing flange, an elastic connecting band encircling said projections, said elastic band having concave portions extending inwardly toward the axis of the respective flange between each two of said projections, each of said concave portions having two legs joined at their inwardly extending ends but otherwise spaced completely apart from one another and free of any projections positioned between said two legs.

2. An improved elastic shaft coupling as set forth in claim 1 wherein said elastic band comprises a plurality of band layers.

3. An improved elastic shaft coupling as set forth in claim 1 wherein said elastic band is mounted on but unsecured to said projections, said elastic band being held in place on said projections by the predetermined shape of said elastic band, thereby limiting circular displacement of one flange relatively to the other flange under operative conditions.

References Cited

UNITED STATES PATENTS

| 1,932,205 | 10/1933 | Dina | 64—27 |
| 1,953,211 | 4/1934 | Benedek | 64—15 |
| 2,034,002 | 3/1936 | Ricefield | 64—14 |

FOREIGN PATENTS

| 291,767 | 5/1916 | Germany. |

HALL C. COE, Primary Examiner

U.S. Cl. X.R.

64—15